Jan. 11, 1966  R. R. MYERS  3,228,330
METHOD OF PRODUCING LAMINATED PRINTING PLATES
Filed April 19, 1962  2 Sheets-Sheet 1
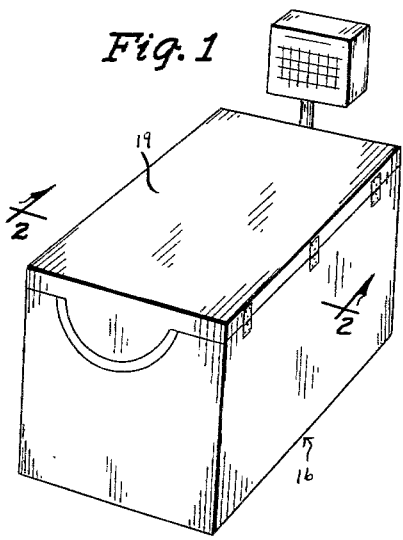
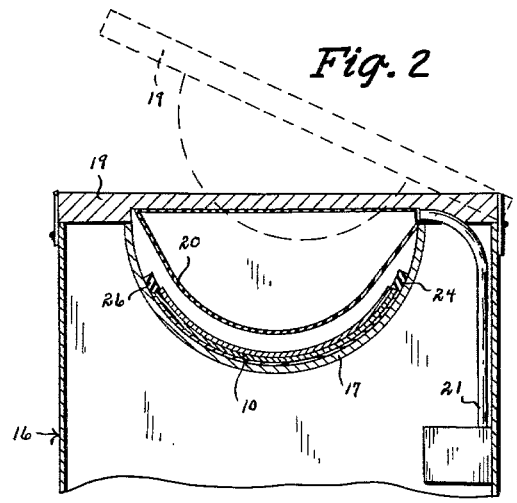
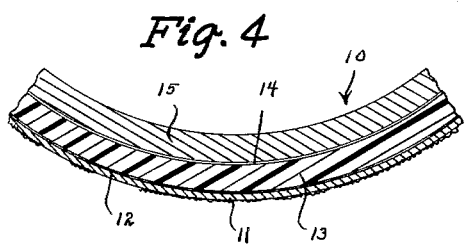
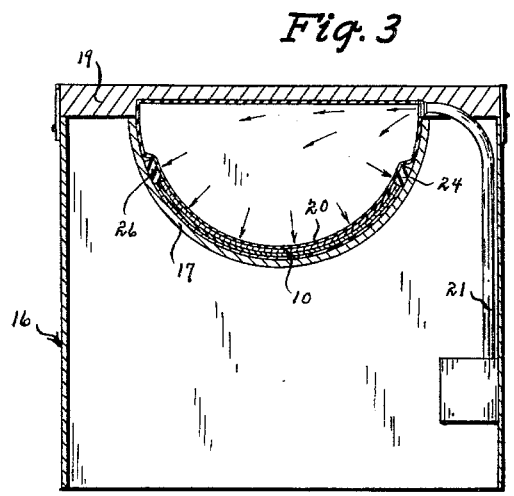
INVENTOR
ROBERT R. MYERS
BY
Talbert, Dick & Darley
ATTORNEYS Jan. 11, 1966  R. R. MYERS  3,228,330
METHOD OF PRODUCING LAMINATED PRINTING PLATES
Filed April 19, 1962  2 Sheets-Sheet 2

INVENTOR
ROBERT R. MYERS
BY
Talbert Dick & Darley
ATTORNEYS 3,228,330
METHOD OF PRODUCING LAMINATED
PRINTING PLATES
Robert R. Myers, Chicago, Ill., assignor to Printing Plate
Supply Co., Chicago, Ill., a corporation of Illinois
Filed Apr. 19, 1962, Ser. No. 188,652
2 Claims. (Cl. 101—401.1)

This invention relates to printing plates and more particularly to a method of and means for producing laminated printing plates.

Most printing plates today are of the laminated type. There is first usually the metallic electrotype shell or like printing element. Secondly a suitable adhesive. Thirdly a sheet of suitable plastic, and in many operations, a backing sheet of lightweight metal such as aluminum. In some instances an adhesive is placed between the plastic and aluminum sheet. In other instances a second sheet of plastic is placed over the metallic sheet. The plastic is in most instances thermoplastic. Such "sandwich" printing plates are disclosed in my United States Letters Patent Number 2,814,990 issued December 3, 1957, on a method of producing printing plates. After the "sandwich" has been assembled it is usually preheated and then placed in a heated press. The "sandwich" is compressed into a rather thin printing plate and after the plastic has cooled and hardened the printing plate is quite rigid and strong. In recent times the tendency is to use a press having one rigid jaw and a second jaw of hydrostatically inflated membrane. The area of the rubber like membrane is greater than that of the area of the plate to be processed. When the membrane is inflated by air or like pressure, it folds around the sides and ends of the laminated plate until it engages the surface of the rigid jaw member. Thus pressure is exerted not only on the top surface of the plate, but around its edges and onto its sides. One advantage claimed for this overlapping of the plate by the membrane was that it would confine the softened plastic within the lamination. Such an apparatus is shown in United States Patent to Bishop, Number 3,023,700, issued March 4, 1962, on a method of making electrotype plates. However, such apparatus encounters serious difficulties and especially if one of the top laminations of the plate is an aluminum or like metallic sheet. By the pressures being at the plate edges and plate corners the metallic lamination is objectionably bent and distorted.

Therefore, one of the principal objects of my invention is to provide a method of compressing laminated printing plates at time of manufacture that will not distort the laminations during the compressing phase.

A further object of my invention is to provide a means for compressing laminated printing plates using plastic laminations that prevents uncontrolled flowing of the plastic material while in heat softened condition.

A still further object of this invention is to provide a device that will rapidly compress and produce successful laminated printing plates.

Still further objects of my invention are to provide a method of compressing and producing laminated printing plates that is economical and easily practiced.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a perspective view of an illustrative press for producing arcuate laminated printing plates.

FIG. 2 is an illustrative cross sectional view of the press taken on line 2—2 of FIG. 1 and shows a laminated printing plate therein and prior to being compressed.

FIG. 3 is an illustrative cross sectional view showing the hydrostatic membrane compressing the laminated plate without bending the edges or corners of the plate.

FIG. 4 is a cross-section of a laminated printing plate.

Figure 5:
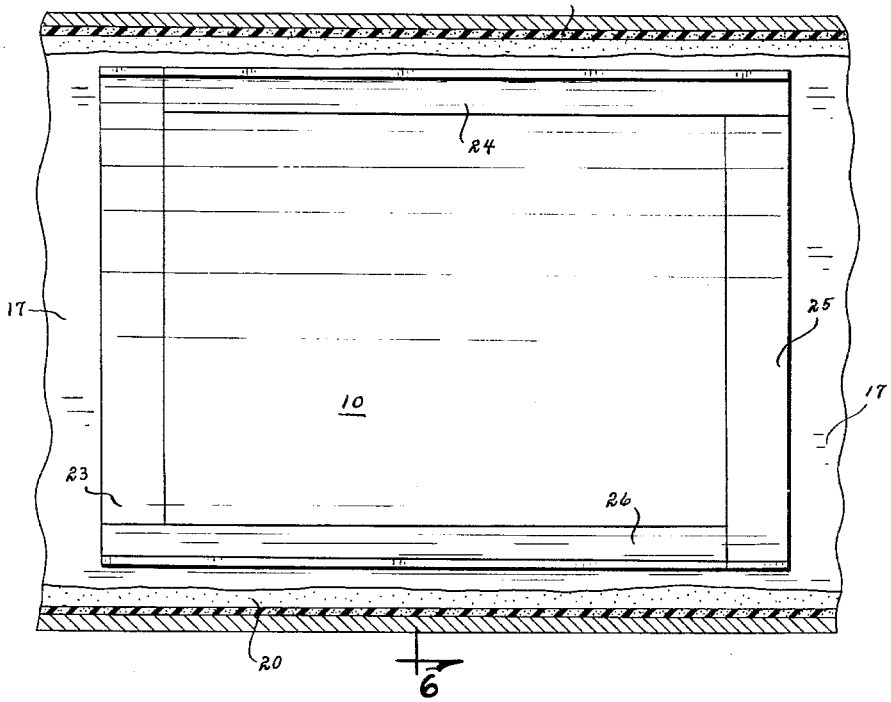
FIG. 5 is an enlarged top plan view of a printing plate on the lower rigid jaw of the press and illustrates my method of framing the ends and sides of the plate.
Figure 6:
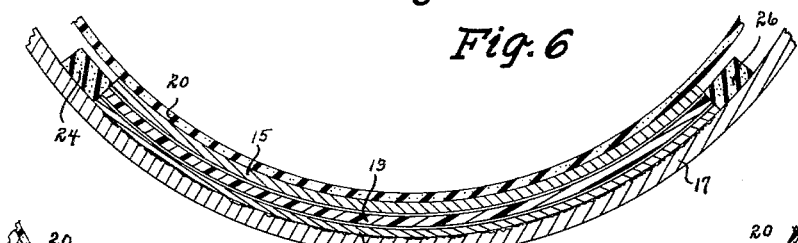
FIG. 6 is an enlarged cross sectional view of the plate before pressure is applied thereto and is taken from line 6—6 of FIG. 5.

The numeral 10 generally designates a laminated printing plate. A laminated printing plate before being compressed may consist of the printing shell 11, a layer of an adhesive 12, a sheet of thermo setting plastic (or like) 13, a layer of an adhesive 14 and a metallic plate 15. Such a plate is shown in detail in FIG. 4.

A common heated press having a hydrostatic pressured membrane is generally designated by the numeral 16. Usually such presses have a rigid curved lower jaw 17 upon which the plate 10 is placed and with the printing shell 11 downwardly and contacting the jaw 17. The upper portion of the press has a lockable hinged lid 19 at its top and above the jaw 17. On the under side of the lid 19 is a resilient flexible bag 20 and which is the movable jaw of the press. The numeral 21 designates a conduit having one end adapted to be in communication (when needed) with a source of air under pressure and its other end communicating with the inside of the bag 20. When the plate 10 is in place on the jaw 17, the lid 19 closed and locked, and fluid passes through the conduit 21 into the membrane bag 20, the lower side of the membrane will bear downwardly on the plate 10. The lower surface of the membrane is of an area greater than that of the surface area of plate 10.

Figure 7:
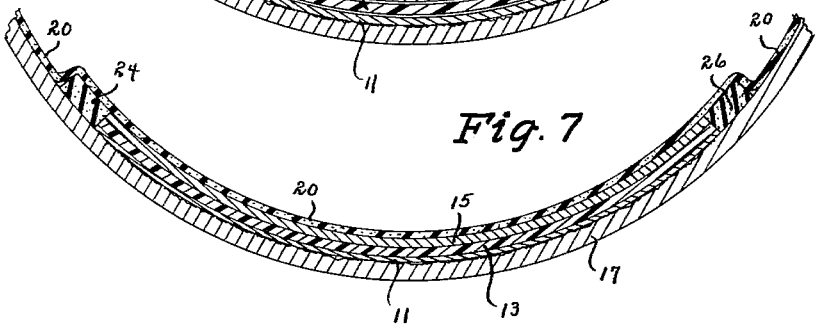
FIG. 7 is an enlarged cross-section of the plate at time pressure is applied thereon.

As herebefore indicated the overlapping of the membrane over and around the sides and corners of the plate when the membrane is inflated, is most objectionable. One of the purposes of this invention is to overcome this objection. I accomplish this by placing a barrier frame around the periphery of the plate as shown in FIG. 3. This frame may be of four assembled bar strips 23, 24, 25 and 26. After the plate 10 has been placed on the jaw 17, the strips 23 and 25 may be laid adjacent the opposite ends respectively of the plate and the strips 24 and 26 laid adjacent the opposite sides, respectively, of the plate. Those closely adjacent strip barriers engage only the peripheral edges of the plate 10 to form a frame around the plate 10 and prevent the membrane from objectionably engaging the edges of the plate as the plate nears its compressed state as shown in FIG. 3. These strips may be of any suitable material, so long as they materially resist compression from the membrane and are not adversely affected by the heating means (not shown) of the apparatus. The membrane will however overlap the frame strips and thereby hold them, and the plate they embrace, in proper positions during the operation. The strips have a thickness substantially equivalent to that of the laminated printing plate being produced as seen in FIG. 7. Furthermore, the strip frame may prevent any material amount of heated flowable plastic or like from laterally escaping from the plate "sandwich" at the time it is heated and compressed. The heating of the plate may be before its placement in the press and/or while in the press after the plate has been compressed and cured, the fluid pressure removed from the membrane, the lid opened and the plate 10 removed.

Some changes may be made in the construction and arrangement of my method of and means for producing laminated printing plates without departing from the real spirit and purpose of my invention, and it is my intention to cover by my claims, any modified forms of structure or use of mechanical equivalents which may be reasonably included within their scope.

I claim:

1. The method of producing laminated printing plates, comprising, the placing of a plurality of laminations of a printing plate in superimposed positions on the rigid jaw portion of a press having an adjacent flexible resilient inflatable membrane wherein at least one of said laminations is a plastic material, the placement of a protective frame having an open center in direct engagement with said rigid jaw portion and being positioned to engage only the peripheral edges of said printing plate laminations, said frame being of a thickness substantially equivalent to that of the laminated printing plate being produced and being of a material that resists compression and is not adversely affected by heating, the application of heat to said laminations to change said plastic lamination to a flowable condition, the inflation of said inflatable membrane to engage and press upon said frame and said laminations wherein said frame is held in position against the peripheral edges of said laminations to protect the edges thereof from said membrane and to maintain said flowable plastic within said laminations, the curing of said plastic and the removal of pressure on said laminations by said membrane, and the removal of said resulting laminated printing plate from said frame and from said rigid jaw portion.

2. The method of producing laminated printing plates, comprising the placing of a plurality of laminations of a printing plate in superimposed positions on the rigid jaw portion of a press having an adjacent flexible resilient inflatable membrane wherein at least one of said laminations is a plastic material, the placement of a plurality of separate bars on said jaw portion around the peripheral edges of said laminations to form a frame therearound, said bars being positioned to engage only the peripheral edges of said printing plate laminations, said frame being of a thickness substantially equivalent to that of the laminated printing plate being produced and being of a material that resists compression and is not adversely affected by heating, the application of heat to said laminations to change said plastic lamination to a flowable condition, the inflation of said inflatable membrane to engage and press upon said frame and said laminations wherein said frame is held in position against the peripheral edges of said laminations to protect the edges thereof from said membrane and to maintain said flowable plastic within said laminations, the curing of said plastic and the removal of pressure on said laminations by said membrane, and the removal of said resulting laminated printing plate from said frame and from said rigid jaw portion.

References Cited by the Examiner

UNITED STATES PATENTS

| 244,024 | 7/1881 | Atwater. | |
|---|---|---|---|
| 912,092 | 2/1909 | Droitcour. | |
| 1,732,023 | 10/1929 | Lytle | 156—105 |
| 1,810,934 | 6/1931 | Watkins. | |
| 1,914,392 | 6/1933 | Worrall | 100—93 X |
| 2,162,825 | 6/1939 | Richards | 101—401.1 |
| 2,571,397 | 10/1951 | Wells. | |
| 2,686,552 | 8/1954 | Faeber et al. | |
| 3,023,700 | 3/1962 | Bishop. | |
| 3,031,960 | 5/1962 | Bishop. | |

DAVID KLEIN, *Primary Examiner.*

WILLIAM B. PENN, *Examiner.*